United States Patent
Sugano et al.

(10) Patent No.: US 10,196,719 B2
(45) Date of Patent: Feb. 5, 2019

(54) DIE STEEL AND METHOD FOR PRODUCING SAME

(71) Applicant: HITACHI METALS, LTD., Tokyo (JP)

(72) Inventors: Ryuuichiroh Sugano, Yasugi (JP); Takaaki Sekiyama, Tokyo (JP); Yasuhiro Hosoda, Yasugi (JP); Hitoshi Kataoka, Yasugi (JP)

(73) Assignee: HITACHI METALS, LTD., Tokyo (JP)

(*) Notice: Subject to any disclaimer, the term of this patent is extended or adjusted under 35 U.S.C. 154(b) by 608 days.

(21) Appl. No.: 14/770,920

(22) PCT Filed: Feb. 20, 2014

(86) PCT No.: PCT/JP2014/053990
§ 371 (c)(1),
(2) Date: Aug. 27, 2015

(87) PCT Pub. No.: WO2014/132868
PCT Pub. Date: Sep. 4, 2014

(65) Prior Publication Data
US 2016/0010189 A1 Jan. 14, 2016

(30) Foreign Application Priority Data
Feb. 28, 2013 (JP) .................. 2013-038272

(51) Int. Cl.
| | | |
|---|---|---|
| C22C 38/46 | (2006.01) | |
| C21D 1/25 | (2006.01) | |
| C22C 38/00 | (2006.01) | |
| C22C 38/02 | (2006.01) | |
| C22C 38/04 | (2006.01) | |
| C22C 38/42 | (2006.01) | |
| C22C 38/44 | (2006.01) | |
| B29C 33/38 | (2006.01) | |
| C21D 1/18 | (2006.01) | |
| C21D 6/00 | (2006.01) | |
| C21D 9/00 | (2006.01) | |
| C22C 38/06 | (2006.01) | |
| C21D 9/22 | (2006.01) | |

(52) U.S. Cl.
CPC .............. *C22C 38/46* (2013.01); *B29C 33/38* (2013.01); *C21D 1/18* (2013.01); *C21D 1/25* (2013.01); *C21D 6/004* (2013.01); *C21D 6/005* (2013.01); *C21D 6/008* (2013.01); *C21D 9/0068* (2013.01); *C22C 38/001* (2013.01); *C22C 38/002* (2013.01); *C22C 38/02* (2013.01); *C22C 38/04* (2013.01); *C22C 38/06* (2013.01); *C22C 38/42* (2013.01); *C22C 38/44* (2013.01); *C21D 9/22* (2013.01)

(58) Field of Classification Search
CPC ............ C22C 38/44; C22C 38/46; C21D 1/25
USPC ....................................... 148/332
See application file for complete search history.

(56) References Cited

FOREIGN PATENT DOCUMENTS

| | | |
|---|---|---|
| CN | 1436874 A | 8/2003 |
| JP | 62-230955 A | 10/1987 |
| JP | 2004-002951 A | 1/2004 |
| JP | 2004-19001 A | 1/2004 |
| JP | 2005-187899 A | 7/2005 |
| JP | 2008-121032 A | 5/2008 |
| JP | 2008-126310 A | 6/2008 |
| JP | 2010-24510 A | 2/2010 |
| JP | 2013-127109 A | 6/2013 |
| JP | 2013-177669 A | 9/2013 |
| WO | 2012/090562 A1 | 7/2012 |
| WO | WO-2012090562 A1 * | 7/2012 .............. C21D 1/18 |

OTHER PUBLICATIONS

Communication dated Oct. 5, 2016, from the European Patent Office in counterpart European application No. 14756563.4.
International Search Report of PCT/JP2014/053990, dated Apr. 8, 2014. [PCT/ISA/210].

* cited by examiner

Primary Examiner — Weiping Zhu
(74) Attorney, Agent, or Firm — Sughrue Mion, PLLC

(57) ABSTRACT

A mold steel that is a steel having a composition containing, in terms of mass %: 0.07 to 0.15% of C; more than 0 and less than 0.8% of Si; more than 0 and not more than 1.0% of Mn; less than 0.05% of P; less than 0.02% of S; more than 0 and not more than 0.5% of Ni; more than 0 and less than 0.8% of Mo and W, either alone or as a complex (Mo+½W); more than 0 and less than 0.15% of V; and 0.25 to 1.5% of Cu, with the balance consisting of Fe, Cr and unavoidable impurities, wherein the content of Cr is more than 4.9% and not more than 5.3% and the hardness of the mold steel is 30 to 42 HRC.

4 Claims, No Drawings

DIE STEEL AND METHOD FOR PRODUCING SAME

CROSS REFERENCE TO RELATED APPLICATIONS

This application is a National Stage of International Application No. PCT/JP2014/053990 filed Feb. 20, 2014 (claiming priority based on Japanese Patent Application No. 2013-038272, filed Feb. 28, 2013), the contents of which are incorporated herein by reference in their entirety.

TECHNICAL FIELD

The present invention relates to a mold steel mainly suitable for plastic molding applications, and a method for producing the steel.

BACKGROUND ART

Followings have been required conventionally for mold steels, particularly used for plastic molding:
(1) good mirror polishability, and pinholes or other minute pits is less likely generated;
(2) high texturability;
(3) high strength, wear resistance and toughness;
(4) high machinability;
(5) high corrosion resistance and rust resistance;
(6) high thermal conductivity;
and the like.

Among them, the rust resistance and the thermal conductivity have been important properties to be improved for recent mold steels. That is, there is a problem that rust occurs on a mold surface due to dew condensation during non-use of the mold such as between production processes or during maintenance. If the rust generates on the mold surface, a step of removing the rust, such as polishing, becomes indispensable for using the mold, which causes reduction of productivity. Therefore, the rust resistance is strongly required to be improved for mold steels. In addition, high thermal conductivity of mold steels is an important property particularly for plastic molding which is subjected to repeat of heating and cooling, in order to shorten the thermal cycle to improve the productivity.

The applicant has proposed a mold steel excellent in the rust resistance and the thermal conductivity, the mold steel having a composition including, by mass % (hereinafter, represented merely as "%"): 0.07 to 0.15% of C; more than 0% and less than 0.8% of Si; more than 0% and less than 1.5% of Mn; less than 0.05% of P; less than 0.06% of S; more than 0% and less than 0.9% of Ni; 2.9 to 4.9% of Cr; one or both of Mo and W wherein an amount of (Mo+½W) is in a range of more than 0% and less than 0.8%; more than 0% and less than 0.15% of V; 0.25 to 1.8% of Cu, and the balance of Fe and inevitable impurities, and the mold steel having a hardness of 30 to 42 HRC (Patent Literature 1).

There has been also proposed a mold steel for plastic molding, having a composition including: 0.03 to 0.25% of C; 0.01% to 0.40% of Si; 0.10% to 1.50% of Mn; 0.30% or less of P; 0.050% or less of S; 0.05% to 0.20% of Cu; 0.05% to 1.50% of Ni; 5.0% to 10.0% of Cr; 0.10% to 2.00% of Mo; 0.01% to 0.10% of V; 0.10% or less of N; 0.01% or less of O; and 0.05% or less of Al, and the balance of Fe and inevitable impurities and satisfying the following expressions: (Cr+Mo)≤10% and 7≤(Cr+3.3Mo) (Patent Literature 2).

CITATION LIST

Patent Literature

PATENT LITERATURE 1: WO2012/090562
PATENT LITERATURE 2: JP-A-2010-024510

SUMMARY OF INVENTION

Technical Problem

The mold steel of Patent Literature 1 is excellent in the rust resistance and the thermal conductivity. With respect to the rust resistance, although the absolute amount of rust is small after the steel is exposed in a high-humidity environment for a long time, the rust formation is likely to start from an early time of the exposure in the course of reaching the amount of the rust. With respect to the rust resistance, the mold steel of Patent Literature 2 is also likely to start the rust formation from the early time of the exposure. During the molds are stored, they sometimes actually started to rust in several tens of minutes when a temperature and humidity of the storage environment are high. Therefore, in a case where the rust formation is evaluated in a comparatively short time, the absolute amount of the rust formation may small, but the amount of rust may become greater than other mold steels. Thus, there has been room for improvement.

An object of the present invention is to provide a mold steel having both excellent thermal conductivity and rust resistance. With respect to the rust resistance, a mold steel is provided that can suppress the rust formation in the early time of the exposure and retard the rusting initiation, in addition to having only a small amount of rust formation during exposure for a long time. The invention also provide a method for suitable for producing the mold steel.

Solution to Problem

The present inventors have reexamined the composition of the mold steel of Patent Literature 1. As a result, it has been found that there is a composition, outside of the range of the above composition, capable of further improving the rust resistance while maintaining the excellent thermal conductivity, and reached to the present invention.

That is, the present invention provides a mold steel having a composition including, by mass %: 0.07 to 0.15% of C; more than 0% and less than 0.8% of Si; more than 0% to 1.0% of Mn; less than 0.05% of P; less than 0.02% of S; more than 0% to 0.5% of Ni; one or both of Mo and W wherein an amount of (Mo+½W) is in a range of more than 0% and less than 0.8%; more than 0% and less than 0.15% of V; 0.25% to 1.5% of Cu, and the balance of Fe, Cr and inevitable impurities, wherein the Cr content is more than 4.9% and not more than 5.3%, wherein the mold steel has a hardness of 30 to 42 HRC. Al, N and O in the inevitable impurities are preferably regulated to, respectively, less than 0.1%, less than 0.06% and less than 0.0055%.

Preferably, the mold steel has the above composition and satisfies that the value of the following Expression 1 by mass % is not more than 1.70, and the value of Expression 2 by mass % is not more than 6.90.

$$70\times[\text{C \%}]+6\times[\text{Si \%}]-[\text{Cr \%}]-3\times[(\text{Mo}+\tfrac{1}{2}\text{W})\text{\%}]-3\times[\text{V \%}]-0.5\times[\text{Cu \%}] \quad \text{Expression 1:}$$

$$[\text{Cr \%}]+3.3\times[(\text{Mo}+\tfrac{1}{2}\text{W})\text{\%}] \quad \text{Expression 2:}$$

Here, characters in brackets [ ] indicate a content of each element by mass %.

Furthermore, the present invention provides a method for producing a mold steel, including quenching and tempering the steel at a temperature of not lower than 530° C. to regulate a hardness of the steel to 30 to 42 HRC, the steel having a composition including, by mass %: 0.07 to 0.15% of C; more than 0% and less than 0.8% of Si; more than 0% to 1.0% of Mn; less than 0.05% of P; less than 0.02% of S; more than 0% to 0.5% of Ni; one or both of Mo and W wherein an amount of (Mo+½W) is in a range of more than 0% and less than 0.8%; more than 0% and less than 0.15% of V; 0.25% to 1.5% of Cu, and the balance of Fe, Cr and inevitable impurities, wherein the Cr content is more than 4.9% and not more than 5.3%. Al, N and O in the inevitable impurities are preferably regulated to, respectively, less than 0.1%, less than 0.06% and less than 0.0055%.

Preferably, the method provides the mold steel having the above composition and satisfies that the value of the following Expression 1 by mass % is not more than 1.70, and the value of Expression 2 by mass % is not more than 6.90.

70×[C %]+6×[Si %]−[Cr %]−3×[(Mo+½W)%]−3×[V %]−0.5×[Cu %]    Expression 1:

[Cr %]+3.3×[(Mo+½W)%]    Expression 2:

Here, characters in brackets [ ] indicate a content of each element by mass %.

Advantageous Effects of Invention

The present invention can provide a mold steel excellent in thermal conductivity. With respect to rust resistance, when the steel is exposed for a long time period, the steel can, with high repeatability, retard initiation of rusting in the early time of the exposure, while an amount of rust formation during the long time period exposure is small. Therefore, the present invention becomes effective for improving the mold technology.

DESCRIPTION OF EMBODIMENTS

The importance point of the present invention lies in specifying such elements as having a large influence on the rusting in the early time of the exposure among the elements included in the mold steel of Patent Literature 1. That is, it has been found that S and Cr have a large influence on the timing of initiation of the rusting (namely, when the rusting starts after the exposure), as well as on an eventual absolute amount of the rust. It has been also found that Mn is an element largely influencing on the timing of initiation of the rusting. By specifying the elements, it can become possible to reconsider the composition of the mold steel of Patent Literature 1, and can achieve to obtain the above higher rust resistance while maintaining the excellent thermal conductivity. Hereinafter, the components of the present invention will be described.

Carbon (C): 0.07 to 0.15%

C is an element for enhancing hardenability and strengthening a structure by depositing Cr, Mo (W) and V carbides during tempering. Thus, C is a fundamental element necessary for keeping a quenching and tempering hardness of 30 to 42 HRC described later. In order to suppress the processing strain generated in machining or the like, it is desirable that a residual stress in a steel is reduced, and it is therefore necessary that the tempering is carried out at a higher temperature. Thus, it is important for the steel according to the present invention, to add C in an amount enough to stably achieve a hardness of not lower than 30 HRC even in tempering, for example, at 530° C. or higher.

However, the C content is set to be not more than 0.15% in the present invention, since increase of the C addition decreases a Cr content solid-solute in a matrix due to formation of Cr carbides and leads to decrease of the rust resistance. In contrast, since the dissolved Cr serves largely for decreasing the thermal conductivity of a mold steel, a too small amount of C for forming Cr carbides degrades the thermal conductivity of the mold steel. Furthermore, a necessary hardness can not be obtained. Thus, the amount of C is set to be not less than 0.07%. A lower limit is preferably 0.08% or more, and more preferably 0.10% or more. An upper limit is preferably 0.13% or less, and more preferably 0.12% or less.

Si: More than 0% and Less than 0.8%

Si is an element which enhances a corrosion resistance against an atmosphere of a mold in use, for example, gases generated from a molding material in plastic molding. When an amount of Si is too large, however, the thermal conductivity of the mold steel remarkably decreases and the thermal conductivity is degraded. Furthermore, when the amount of Si is decreased, anisotropy of mechanical properties is reduced and the banded segregation decreases, and thus excellent mirror polishability is provided. Therefore, in the present invention, the amount of Si is set to be less than 0.8%. A lower limit is preferably 0.1% or more, more preferably 0.15% or more, and further more preferably 0.20% or more. 0.25% or more is especially preferable. An upper limit is preferably 0.6% or less, and more preferably 0.5% or less.

Mn: More than 0% to 1.0%

Mn is an element which enhances hardenability, suppresses formation of ferrites, and imparts a proper quenching and tempering hardness. However, Mn has a large degree of influence on the thermal conductivity among elements constituting the mold steel according to the present invention. When the amount of Mn is too large, the thermal conductivity of the mold steel is largely degraded. In the mold steel according to the present invention, increased Cr content decreases the thermal conductivity as described later. Therefore, the control of an upper limit of Mn is especially important. Furthermore, when the amount of Mn is too large, not only the thermal conductivity is remarkably impaired, but Mn bonds to S as described later to form a nonmetallic inclusion MnS, which serves as a cause of rusting and pinholes. MnS becomes starting points of rust formation and serves as a major cause of expediting the initiation of rusting. Therefore, control of the upper limit of Mn is especially important also in this point. Since Mn increases viscosity of a matrix and decreases machinability, the upper limit of Mn is set to be 1.0% or less. A lower limit is preferably 0.1% or more, more preferably 0.2% or more, and further more preferably 0.3% or more. The upper limit is preferably 0.9% or less, more preferably 0.8% or less, and further more preferably 0.6% or less.

Phosphor (P): Less than 0.05%

P is an element unavoidably contained in a steel. When an amount of P is too large, it decreases hot workability and toughness. Therefore, the amount of P is set to be less than 0.05%, preferably 0.03% or less in the present invention.

Sulfur (S): Less than 0.02%

S is an element unavoidably included in a steel even if not added. S has a large effect on improvement of machinability when it is present as a nonmetallic inclusion MnS. The presence of a large amount of MnS, however, cases decrease of performances of a mold itself, such as promoting anisotropy of mechanical properties, particularly the toughness. MnS becomes starting points of rusting and pinholes, and causes to expedite initiation of rusting. Thus, the rust resistance and the polishability, which are important properties for the steel according to the present invention, are thereby largely degraded. In the present invention, in order to decrease the amount of formation of MnS, the upper limit of Mn is especially controlled. Even in a case where S is added, the amount of Mn needs to be limited to less than 0.02%. 0.01% or less is preferable. A preferable lower limit is 0.005%.

Ni: More than 0 to 0.5%

Ni also enhances hardenability of the steel according to the present invention, and suppresses formation of ferrite. Ni is an element which improves rust resistance of the steel according to the present invention. However, Ni also has a large degree of influence on thermal conductivity like Mn. When an amount of Ni is too large, the thermal conductivity largely decreases. Therefore, control of an upper limit of Ni is also important for the mold steel according to the present invention which includes an increased amount of Cr. Furthermore, Mn increases viscosity of a matrix and thus decreases machinability. Therefore, the amount of Ni is set to be not more than 0.5%. A lower limit is preferably 0.1% or more, and more preferably 0.15% or more. An upper limit is preferably 0.3% or less, and more preferably 0.2% or less.

One or Both of Mo and W Wherein (Mo+½W) is in a Range of More than 0% and Less than 0.8%

Mo and W cause fine carbides to be deposited and agglomerated during tempering to improve strength of the steel according to the present invention. Furthermore, Mo and W increases resistance to softening during the tempering. Mo and W dissolve in a matrix like Cr, and enhance rust resistance of the steel according to the present invention. Thus, they are included singly or as a complex. Furthermore, a part of Mo and W dissolve in an oxide film on a surface of the mold to exhibit an effect of enhancing corrosion resistance against, for example, corrosive gases generated from plastics during use of the mold. However, a too large amount of Mo and W decreases machinability. When an amount of the solid-solute Mo and W increases, thermal conductivity is remarkably decreased. Although W exhibits similar effects as Mo, the effects of W is a half of that Mo if their effects by the same content are compared. Thus, an amount of one or both of Mo and W is set such a value of an expression (Mo+½W) is less than 0.8% according to the present invention. A lower limit is preferably 0.1% or more, and more preferably 0.3% or more. An upper limit is preferably 0.6% or less, and more preferably 0.5% or less.

Vanadium (V): More than 0% and Less than 0.15%

V enhances a resistance to temper softening, and suppresses coarsening of crystal grains to contribute to improve toughness. V further has an effect of forming fine hard carbides to improve wear resistance. Since too large amount of V decreases machinability, however, the amount of V is set to be less than 0.15%. A lower limit is preferably 0.03% or more, more preferably 0.05% or more, further more preferably 0.07% or more. A upper limit is preferably 0.13% or less, more preferably 0.10% or less.

Cu: 0.25 to 1.5%

Cu is an element which deposits and agglomerates as Fe—Cu solid solutions during tempering and improves strength of the steel according to the present invention. However, too large amount of Cu decreases hot workability remarkably. Also, Cu effectively functions to retard initiation of rusting. However, Cu has a large effect on thermal conductivity like Mn and N. When the amount of Cu is too large, a coefficient of thermal conductivity largely decreases to degrade the thermal conductivity of the steel according to the present invention. Therefore, a control of the upper limit of Cu is also important. The amount of Cu according to the present invention is set to be 0.25 to 1.5%. A lower limit is preferably 0.40% or more, more preferably 0.70% or more. An upper limit is preferably 1.2% or less, more preferably 1.0% or less.

Cr: More than 4.9 to 5.3%

In the present invention, it is important to regulate a Cr content for the mold steel having a composition including the above elements and the balance of Fe, Cr and inevitable impurities. Cr is an important element to reduce an absolute amount of rust formation and additionally retard initiation of the rust formation. Cr is an element which deposits and agglomerates as fine carbides during tempering and enhances strength of the steel according to the present invention. On the other hand, Cr dissolves in a matrix in a sufficient amount, and is capable of reducing the eventual amount of rust formation as well as retarding the initiation the rust formation, thereby enhancing the rust resistance of the steel according to the present invention. In Patent Literature 1, Cr is understood simply as an element of reducing the eventual amount of the rust. However, the present inventors have found that an increased amount of Cr can further retard the initiation of the rust formation and suppress the initial rust formation. When a nitriding treatment is further carried out, Cr has also an effect of enhancing a hardness of the nitride layer. If the amount of Cr is too large, however, the amount of the dissolved Cr increases so that the thermal conductivity is remarkably decreased and a softening resistance is also decreased. Therefore, the amount of Cr according to the present invention is set to be more than 4.9 to 5.3%. A lower limit is preferably 5.0% or more. An upper limit is preferably 5.2% or less.

Preferably Al: Less than 0.1%

Al as inevitable impurities is usually used as a deoxidizing element in smelting. If a large amount of $Al_2O_3$ is present in the steel according to the present invention after the hardness is regulated, mirror polishability is degraded. Furthermore, when an amount of inevitable inclusions (amount of inevitable impurities) in a structure of the mold steel increases, rust is liable to be formed in the early time period. Therefore, an amount of Al in the present invention is preferably regulated to be less than 0.1%, more preferably less than 0.05%, and further more preferably less than 0.01%.

Preferably Nitrogen (N): Less than 0.06%

N as inevitable impurities is an element forming nitrides in a steel. An excessive amount of nitrides causes deterioration of toughness, machinability and the polishability of the mold remarkably. Furthermore, when an amount of inevitable inclusions (amount of inevitable impurities) in a structure of the mold steel increases, rust is liable to be formed in the early time period. Therefore, the amount of N in the steel is preferably regulated to a low value. Therefore, the amount of N in the present invention is preferably specified to be less than 0.06%, more preferably less than 0.03%, and further more preferably 0.01% or less.

Preferably Oxygen (O): Less than 0.0055%

O as inevitable impurities is an element forming oxides in a steel. An excessive amount of oxides causes remarkable deterioration of cold plastic workability and the polishability. Furthermore, when an amount of inevitable inclusions (amount of inevitable impurities) in a structure of the mold steel increases, rust is liable to be formed in the early time period. In the present invention, it is important to suppress particularly the formation of $Al_2O_3$. Therefore, O in the present invention is preferably regulated to be less than 0.0055%, and more preferably less than 0.0030%.

Preferably, a value of the following Expression 1 is not more than 1.70, and a value of Expression 2 is not more than 6.90 (characters in brackets [ ] indicate a content (by mass %) of each element).

$$70\times[C\%]+6\times[Si\%]-[Cr\%]-3\times[(Mo+\tfrac{1}{2}W)\%]-3\times[V\%]-0.5\times[Cu\%] \quad \text{Expression 1:}$$

$$[Cr\%]+3.3\times[(Mo+\tfrac{1}{2}W)\%] \quad \text{Expression 2:}$$

It is necessary to regulate contents of many elements constituting the steel according to the present invention in the above compositional ranges in order to achieve excellent rust resistance and thermal conductivity, which are characteristic properties of the present invention, besides satisfying basic properties such as strength, softening resistance and machinability. However, degrees of influences on the rust resistance and the thermal conductivity differ between the elements. Therefore, it is effective to control the contents of the elements mutually in order to satisfy the excellent rust resistance and thermal conductivity while maintaining the basic properties. In Patent Literature 1, degrees of influences of individual constituting elements of the steel on the rust resistance and the thermal conductivity was investigated and the degree of influence of each constituting element are shown as a mutual coefficient by a multiple regression analysis. As a result of further studies at this time, the present inventors have found that there is still room left for further optimizing a ratio of constituting elements in order to retard the initiation of rust formation without impairing the thermal conductivity.

That is indices for well balancing the effect of retarding the initiation of the rust formation of the steel and the excellent thermal conductivity, and is effective parameters collectively evaluating the degree of influence of each constituting element on the balance of both properties. The parameters can be represented mutually by the following novel Expression 1 and Expression 2.

$$70\times[C\%]+6\times[Si\%]-[Cr\%]-3\times[(Mo+\tfrac{1}{2}W)\%]-3\times[V\%]-0.5\times[Cu\%] \quad \text{Expression 1:}$$

$$[Cr\%]+3.3\times[(Mo+\tfrac{1}{2}W)\%] \quad \text{Expression 2:}$$

In Expression 1 and Expression 2, a coefficient of an element functioning to improve the balance of both the properties is represented as minus, while a coefficient of an element functioning to reduce the balance is represented as plus. As the absolute value of each coefficient is higher, the degree of the influence is larger. In the case of the steel according to the present invention, it is preferable that the value of Expression 1 is 1.70 or less for maintaining the balance between both the properties. The value is more preferably 1.65 or less, and further more preferably 1.60 or less. Furthermore, it is preferable that the value of Expression 2 is 6.90 or less for maintaining the balance. The value is more preferably 6.80 or less, and further more preferably 6.70 or less. When either one of the values of Expression 1 and Expression 2 satisfies the above condition, the effect of maintaining the balance is obtained. In addition, when the values of both the Expressions satisfy the above conditions, the effect is more effectively obtained.

Hardness of the Mold Steel is 30 to 42 HRC.

When a hardness of the mold steel is too low, mirror polishability decreases in a process of the mold fabrication. As well, wear resistance of a mold product decreases. In contrast, when the hardness of the mold steel is too high, machinability decreases in the mold fabrication process. As well, toughness of the mold product decreases. Therefore, the hardness of the mold steel according to the present invention is made to be 30 to 42 HRC. A lower limit is preferably 35 HRC or higher. An upper limit is preferably 40 HRC or lower. The mold steel according to the present invention can be used as a so-called prehardened steel, which is regulated to the hardness by a quenching and tempering heat treatment and then machined into a mold shape.

The mold steel according to the present invention can achieve the hardness of not lower than 30 HRC, further not lower than 35 HRC stably even by tempering at a high temperature of not lower than 530° C. This can be achieved even by tempering at not lower than 540° C. As stated above, it is advantageous to tempering at a high temperature such that a residual stress in the steel can be reduced, for suppressing a working strain generated in machining or the like. The mold steel according to the present invention is regulated to have an optimized composition exhibiting both the excellent rust resistance and thermal conductivity as well as the above tempering property. The quenching temperature at this time is not limited. Quenching, for example, from a temperature at 900° C. or higher can be applied.

Example 1

Molten steels regulated to have predetermined compositions were cast to produce 10 ton ingots. The compositions are shown in Table 1. A comparative steel B corresponds to a mold steel of Patent Literature 1 including not more than 4.9% Cr.

TABLE 1

| | Composition (by mass %) | | | | | | | | |
|---|---|---|---|---|---|---|---|---|---|
| No. | C | Si | Mn | P | S | Ni | Cr | Mo | W$^{X.1}$ |
| Steel A according to the Invention | 0.120 | 0.29 | 0.32 | 0.025 | 0.0073 | 0.20 | 5.05 | 0.33 | <0.01 |
| Comparative Steel B | 0.120 | 0.33 | 0.31 | 0.021 | 0.0139 | 0.20 | 4.57 | 0.24 | <0.01 |

TABLE 1-continued

| No. | Composition (by mass %) | | | | | Fe[X2] | Value of Expression 1[X3] | Value of Expression 2[X4] |
|---|---|---|---|---|---|---|---|---|
| | V | Cu | Al | N | O | | | |
| Steel A according to the Invention | 0.09 | 0.83 | 0.002 | 0.0114 | 0.0023 | Bal. | 3.42 | 6.14 |
| Comparative Steel B | 0.08 | 0.86 | 0.001 | 0.0086 | 0.0021 | Bal. | 4.42 | 5.36 |

[X1]not added
[X2]impurities are included
[X3]70 × [C %] + 6 × [Si %] − [Cr %] − 3 × [(Mo + 1/2W) %] − 3 × [V %] − 0.5 × [Cu %]
[X4][Cr %] + 3.3 × [(Mo + 1/2W) %]

The steel ingots were heated at 1,100° C., and then forged to produce steel materials having a thickness of 650 mm and a width of 1,000 mm. They were subjected to a quenching treatment by air cooling from 950° C. and a tempering treatment to regulate their hardness. As a result, the steel A according to the present invention and the comparative steel B had a hardness of 37 HRC by high-temperature tempering at 560° C., which is advantageous for reducing a residual stress in the steel materials. Then, each hardened steel material was processed to take test pieces of two shapes, one of which is of 5 mm×10 mm×15 mm for evaluation of a rust resistance, and the other has a diameter of 10 mm and a thickness of 1 mm for evaluation of thermal conductivity. Following tests were carried out with the test pieces.

(Evaluation of Rust Resistance)

The test pieces for evaluation of the rust resistance were subjected to an exposure test in an atmosphere of a rusting environment at a temperature of 40° C. and in a humidity of 87%. The conditions are assumed to be an environment in which an actual mold is stored. Then, degrees of rusting on a surface of the test pieces were checked at times when 10, 20, 30, 60 and 120 minutes had passed from the start of the exposure, and the rusting states were evaluated from the early time period of the exposure. The degrees of rusting were checked as follows. An area ratio of the rust in a region of 265 μm×350 μm in the central part of the surface of 10 mm×15 mm of the test piece ([an area of rust/an area of the central part]×100) was calculated. The central part was taken as the measuring region since edge parts of the test piece includes working flaws or the like that leads to rust forming and causes of rust formation other than the composition can be excluded to the utmost at the center part.

(Evaluation of Thermal Conductivity)

The thermal conductivity of the test piece was measured by a laser flash method. In the method, a laser light is irradiated on a surface of the test piece and a thermal diffusivity and a thermal conductivity of a test piece are measured from temperature rise. Results of the thermal conductivities are shown in Table 2 together with the calculation results of the area ratios of rust.

TABLE 2

| No. | Area Ratio of Rust Formation (%) | | | | | Thermal Conductivity (W/m/K) |
|---|---|---|---|---|---|---|
| | After 10 minutes | After 20 minutes | After 30 minutes | After 60 minutes | After 120 minutes | |
| Steel A according to the Invention | 0.00 | 0.00 | 0.02 | 0.02 | 0.02 | 33.9 |
| Comparative Steel B | 0.10 | 0.10 | 0.13 | 0.13 | 0.15 | 30.6 |

According to the results in Table 2, the steel A having the best regulated composition exhibits a thermal conductivity exceeding 30 W/m/K like the comparative steel B, and achieved excellent thermal conductivity. With respect to the rust resistance, the steel A exhibited only a small eventual amount of rust formation when the long time exposure was finished, and additionally no rust was formed at the early time period from the start of the test. In contrast, the comparative steel B began to rust at the early time period from the start of the test, although the thermal conductivity was excellent and the eventual amount of rust formation was sufficiently acceptable.

Example 2

Molten steels regulated to have predetermined compositions were cast to produce 10 kg ingots. The weight of the ingot (amount of molten steel) was made lower than that of Example 1 to exclude causes of rust formation other than compositions to the utmost. Rust is liable to be formed due to an increase of inevitable inclusions (inevitable impurities) in a structure and the like, as the ingot becomes large. The compositions are shown in Table 3. The comparative steel 1 corresponds to a mold steel of Patent Literature 1, and the comparative steels 2 to 4 corresponds to mold steels of Patent Literature 2.

TABLE 3

| No. | Composition (by mass %) | | | | | | | | |
|---|---|---|---|---|---|---|---|---|---|
| | C | Si | Mn | P | S | Ni | Cr | Mo | W[※1] |
| Steel 1 according to the Invention | 0.089 | 0.29 | 0.78 | 0.006 | 0.0052 | 0.20 | 4.93 | 0.45 | <0.01 |
| Steel 2 according to the Invention | 0.100 | 0.24 | 0.76 | 0.006 | 0.0049 | 0.20 | 4.96 | 0.45 | <0.01 |
| Steel 3 according to the Invention | 0.103 | 0.25 | 0.79 | 0.006 | 0.0052 | 0.20 | 5.02 | 0.46 | <0.01 |
| Steel 4 according to the Invention | 0.099 | 0.24 | 0.82 | 0.006 | 0.0047 | 0.20 | 5.09 | 0.45 | <0.01 |
| Comparative Steel 1 | 0.122 | 0.25 | 0.34 | 0.006 | 0.0049 | 0.20 | 4.65 | 0.31 | <0.01 |
| Comparative Steel 2 | 0.124 | 0.31 | 0.79 | 0.007 | 0.0055 | 0.40 | 5.11 | 1.20 | <0.01 |
| Comparative Steel 3 | 0.125 | 0.30 | 0.78 | 0.007 | 0.0060 | 0.20 | 5.35 | 0.46 | <0.01 |
| Comparative Steel 4 | 0.103 | 0.30 | 0.77 | 0.006 | 0.0051 | 0.20 | 5.00 | 0.49 | <0.01 |
| Comparative Steel 5 | 0.100 | 0.29 | 0.97 | 0.006 | 0.0046 | 1.19 | 4.89 | 0.49 | <0.01 |
| Comparative Steel 6 | 0.103 | 0.30 | 0.49 | 0.006 | 0.0048 | 0.20 | 6.00 | 0.32 | <0.01 |
| Comparative Steel 7 | 0.103 | 0.25 | 0.72 | 0.006 | 0.0047 | 0.20 | 6.08 | 0.31 | <0.01 |
| Comparative Steel 8 | 0.099 | 0.30 | 0.50 | 0.006 | 0.0043 | 0.21 | 5.97 | 0.31 | <0.01 |

| No. | Composition (by mass %) | | | | | | Value of Expression 1[※3] | Value of Expression 2[※4] |
|---|---|---|---|---|---|---|---|---|
| | V | Cu | Al | N | O | Fe[※2] | | |
| Steel 1 according to the Invention | 0.07 | 0.29 | 0.003 | 0.0009 | 0.0046 | Bal. | 1.34 | 6.42 |
| Steel 2 according to the Invention | 0.11 | 0.29 | 0.003 | 0.0008 | 0.0035 | Bal. | 1.66 | 6.45 |
| Steel 3 according to the Invention | 0.12 | 0.58 | 0.003 | 0.0009 | 0.0036 | Bal. | 1.66 | 6.54 |
| Steel 4 according to the Invention | 0.12 | 1.47 | 0.002 | 0.0009 | 0.0054 | Bal. | 0.84 | 6.58 |
| Comparative Steel 1 | 0.07 | 0.83 | 0.002 | 0.0008 | 0.0025 | Bal. | 3.84 | 5.67 |
| Comparative Steel 2 | 0.06 | 0.10 | 0.002 | 0.0009 | 0.0038 | Bal. | 1.60 | 9.07 |
| Comparative Steel 3 | 0.08 | 0.15 | 0.002 | 0.0008 | 0.0037 | Bal. | 3.51 | 6.87 |
| Comparative Steel 4 | 0.10 | 0.20 | 0.002 | 0.0010 | 0.0032 | Bal. | 2.14 | 6.62 |
| Comparative Steel 5 | 0.01 | 0.01 | 0.002 | 0.0012 | 0.0054 | Bal. | 2.35 | 6.51 |
| Comparative Steel 6 | 0.01 | 0.25 | 0.002 | 0.0009 | 0.0046 | Bal. | 1.90 | 7.06 |
| Comparative Steel 7 | 0.01 | 1.46 | 0.002 | 0.0008 | 0.0038 | Bal. | 0.94 | 7.10 |
| Comparative Steel 8 | 0.01 | 0.20 | 0.003 | 0.0010 | 0.0059 | Bal. | 1.72 | 6.99 |

[※1]not addition
[※2]impurities are included
[※3]$70 \times [C\%] + 6 \times [Si\%] - [Cr\%] - 3 \times [(Mo + 1/2W)\%] - 3 \times [V\%] - 0.5 \times [Cu\%]$
[※4]$[Cr\%] + 3.3 \times [(Mo + 1/2W)\%]$ Then, the ingots were heated at 1,150° C., and then forged to produce steel materials having a cross-section of 30 mm×30 mm. They were then subjected to annealing at 860° C. Each annealed material was processed to take test pieces of three shapes: 10 mm×10 mm×10 mm for evaluation of hardness; 5 mm×8 mm×15 mm for evaluation of rust resistance; and 10 mm in diameter×2 mm in thickness for evaluation of the thermal conductivity. The test pieces were tested as follows.

(Evaluation of Hardness)

The test pieces for evaluation of hardness were subjected to a quenching treatment by air cooling from 950° C., and then to a tempering treatment. The tempering treatment was carried out at 550° C. for 2 hours as a high-temperature tempering, which was advantageous for reducing a residual stress in the test piece. The tempered test pieces of the steels 1 to 4 according to the present invention had a hardness of not lower than 35 HRC.

(Evaluation of Rust Resistance)

The test pieces for evaluation of rust resistance were subjected to a quenching and tempering treatment under the same condition as the above evaluation of hardness. Then, the test pieces were subjected to an exposure test in an atmosphere of a rusting environment at a temperature of 40° C. and in a humidity of 87% as in Example 1. Then, degrees of rusting on a surface of the test pieces were checked at times when 10, 20, 30, 60, 120 and 240 minutes had passed from the start of the exposure, and the rusting states were evaluated from the early time period of the exposure. The degree of rusting was checked as follows. An area ratio of the rust in a region of 265 μm×350 μm in the central part of the surface of 8 mm×15 mm of the test piece was calculated. The central part was taken as the measuring region since edge parts of the test piece includes working flaws or the like that leads to rust forming and causes of rust formation other than the composition can be excluded to the utmost at the center part.

(Evaluation of Thermal Conductivity)

The test pieces for evaluation of thermal conductivity were subjected to a quenching and tempering treatment under the same condition as the above evaluation of hardness. Then, the thermal conductivity of the test pieces after the quenching and tempering treatment was measured by the laser flash method as in Example 1. The results of the thermal conductivities are shown in Table 4 together with the results of the 550° C.-tempering hardnesses and the calculation of the area ratios of rust.

TABLE 4

| No. | Area Ratio of Rust Formation (%) | | | | | | Thermal Conductivity (W/m/K) | Hardness (HRC) |
| --- | --- | --- | --- | --- | --- | --- | --- | --- |
| | After 10 minutes | After 20 minutes | After 30 minutes | After 60 minutes | After 120 minutes | After 240 minutes | | |
| Steel 1 according to the Invention | 0.00 | 0.00 | 0.00 | <0.01 | <0.01 | 0.8 | 30.6 | 36.2 |
| Steel 2 according to the Invention | 0.00 | 0.00 | 0.00 | <0.01 | <0.01 | 1.0 | 31.2 | 37.7 |
| Steel 3 according to the Invention | 0.00 | 0.00 | 0.00 | <0.01 | <0.01 | 0.9 | 30.2 | 37.4 |
| Steel 4 according to the Invention | 0.00 | 0.00 | 0.00 | <0.01 | <0.01 | 0.4 | 30.6 | 37.0 |
| Comparative Steel 1 | 0.00 | 0.00 | <0.01 | <0.01 | <0.01 | 3.0 | 30.2 | 38.4 |
| Comparative Steel 2 | 0.00 | 0.00 | <0.01 | <0.01 | 0.01 | 1.3 | 27.7 | 40.6 |
| Comparative Steel 3 | 0.00 | 0.00 | <0.01 | <0.01 | 0.01 | 3.1 | 30.0 | 37.8 |
| Comparative Steel 4 | 0.00 | 0.00 | <0.01 | <0.01 | 0.01 | 1.2 | 30.0 | 37.3 |
| Comparative Steel 5 | 0.00 | 0.00 | <0.01 | 0.01 | 0.01 | 3.1 | 29.1 | 31.9 |
| Comparative Steel 6 | 0.00 | 0.00 | <0.01 | <0.01 | <0.01 | 1.4 | 28.7 | 30.3 |
| Comparative Steel 7 | 0.00 | 0.00 | <0.01 | <0.01 | <0.01 | 0.4 | 29.5 | 28.3 |
| Comparative Steel 8 | 0.00 | 0.00 | <0.01 | <0.01 | <0.01 | 1.3 | 29.6 | 28.6 |

Comparing the results in Table 4 with those of Example 1 (Table 2), the progress of rust formation was slow as a whole. It is because the values of Expression 1 satisfied 1.70 or less and the values of Expression 2 satisfied 6.90 or less in the compositions of the steels 1 to 4 according to the present invention. It is conceived that the small size of the ingot excluded causes of the rust formation, such as inclusions, other than component composition. In Table 4, the statement of "<0.01%" in the column of the area ratio of rust formation (%) indicates that the rust was confirmed but the degree of the rust was too low to calculate the area ratio.

From the results in Table 4, the steels 1 to 4 having the best regulated composition exhibit a thermal conductivity exceeding 30 W/m/K and achieved excellent rust resistance such that the rust formation was suppressed from the early time period from the start of the test. Furthermore, the steels 1 and 4 according to the present invention, which were regulated to have low values of Expression 1 and Expression 2, were excellent in the balance of the thermal conductivity and the rust resistance.

In contrast, the comparative steel 1 is a mold steel having a low Cr content. The comparative steel 1 exhibited a thermal conductivity exceeding 30 W/m/K. Comparing with the steels according to the present invention, however, the rust formation was confirmed at a time point of 30 minutes after the exposure to the rusting environment.

The comparative steels 2, 3 and 4 are mold steels having a low Cu content. Among them, the comparative steels 3 and 4 had good thermal conductivity, but rusting was confirmed at a time point of 30 minutes after the exposure, and it progressed to a degree that the rust could be quantitated at a time point of 120 minutes after the exposure. The comparative steel 2 includes a large amount of Mo and had a thermal conductivity below 30 W/m/K.

The comparative steel 5 is a mold steel having a lower Cu content than the comparative steels 2, 3 and 4. Since a Ni content is high and a Cr content is low, the rust resistance decreases and quantifiable rust was formed at a time point of 60 minutes after the exposure. Furthermore, the thermal conductivity was below 30 W/m/K.

The comparative steels 6, 7 and 8 are mold steels having a high Cr content. Although the rust resistance was good, the thermal conductivity was below 30 W/m/K. The comparative steels 7 and 8 could not achieve a hardness of 30 HRC by tempering at 550° C. (the softening resistance decreased).

INDUSTRIAL APPLICABILITY

The steel according to the present invention also satisfies essential properties required for molds, and thus it can be applied to mold for rubber molding, dies for hot working used in small-lot production, and die casting, as well as mold for plastic molding.

The invention claimed is:

1. A mold steel comprising, by mass %:
   0.07% to 0.15% of C;
   more than 0% and less than 0.8% of Si;
   more than 0% to 1.0% of Mn;
   less than 0.05% of P;
   less than 0.02% of S;
   more than 0% to 0.5% of Ni;
   one or both of Mo and W, where an amount of (Mo+½W) is in a range of more than 0% and less than 0.8%;
   more than 0% and less than 0.15% of V;
   0.25% to 1.5% of Cu, and
   the balance of Fe, Cr and inevitable impurities, wherein a Cr content is more than 4.9% and not more than 5.3%; wherein the mold steel has a hardness of 30 to 42 HRC, and wherein a value of following Expression 1 satisfies not greater than 1.70 by mass %, and a value of following Expression 2 satisfies not greater than 6.90 by mass %:

$$70 \times [C\%] + 6 \times [Si\%] - [Cr\%] - 3 \times [(Mo+\tfrac{1}{2}W)\%] - 3 \times [V\%] - 0.5 \times [Cu\%]; \text{ and} \qquad \text{Expression 1:}$$

$$[Cr\%] + 3.3 \times [(Mo+\tfrac{1}{2}W)\%], \qquad \text{Expression 2:}$$

where characters in brackets [ ] indicate a content of each element by mass %.

2. The mold steel according to claim 1, wherein Al, N and O in the inevitable impurities are regulated, respectively, to less than 0.1%, less than 0.06% and less than 0.0055%, by mass %.

3. A method for producing a mold steel, comprising quenching the steel and tempering the steel at a temperature of not lower than 530° C. to regulate a hardness of the steel to 30 to 42 HRC, the steel having a composition comprising, by mass %:
   0.07% to 0.15% of C;
   more than 0% and less than 0.8% of Si;
   more than 0% to 1.0% of Mn;
   less than 0.05% of P;
   less than 0.02% of S;

more than 0% to 0.5% of Ni;
one or both of Mo and W, where an amount of (Mo+½W) is in a range of more than 0% and less than 0.8%;
more than 0% and less than 0.15% of V;
0.25% to 1.5% of Cu, and
the balance of Fe, Cr and inevitable impurities, wherein a Cr content is more than 4.9% and not more than 5.3%, wherein a value of following Expression 1 satisfies not greater than 1.70 by mass %, and a value of following Expression 2 satisfies not greater than 6.90 by mass %:

$$70\times[C\%]+6\times[Si\%]-[Cr\%]-3\times[(Mo+\tfrac{1}{2}W)\%]-3\times[V\%]-0.5\times[Cu\%]; \text{and} \quad \text{Expression 1:}$$

$$[Cr\%]+3.3\times[(Mo+\tfrac{1}{2}W)\%], \quad \text{Expression 2:}$$

where characters in brackets [ ] indicate a content of each element by mass %.

4. The method according to claim 3, wherein Al, N and O in the inevitable impurities are regulated, respectively, to less than 0.1%, less than 0.06% and less than 0.0055%, by mass %.

* * * * *